(12) United States Patent
Subramaniam

(10) Patent No.: US 7,979,807 B2
(45) Date of Patent: Jul. 12, 2011

(54) METHOD AND SYSTEM FOR COMMUNICATING AND EXCHANGING DATA BETWEEN BROWSER FRAMES

(75) Inventor: Taruvai N Subramaniam, Troy, MI (US)

(73) Assignee: RouteOne LLC, Farmington Hills, MI (US)

( * ) Notice: Subject to any disclaimer, the term of this patent is extended or adjusted under 35 U.S.C. 154(b) by 609 days.

(21) Appl. No.: 10/936,203

(22) Filed: Sep. 7, 2004

(65) Prior Publication Data

US 2006/0053224 A1   Mar. 9, 2006

(51) Int. Cl.
G06F 3/048   (2006.01)

(52) U.S. Cl. ........ 715/804; 715/743; 715/749; 715/760; 715/762; 715/769

(58) Field of Classification Search .................. 715/804, 715/743, 749, 760, 769
See application file for complete search history.

(56) References Cited

U.S. PATENT DOCUMENTS

| | | | |
|---|---|---|---|
| 6,151,622 A * | 11/2000 | Fraenkel et al. | 709/205 |
| 6,681,229 B1 * | 1/2004 | Cason et al. | 1/1 |
| 6,686,932 B2 * | 2/2004 | Rath et al. | 715/748 |
| 6,687,746 B1 * | 2/2004 | Shuster et al. | 709/223 |
| 6,725,403 B1 * | 4/2004 | Schmoelz | 714/723 |
| 6,772,167 B1 * | 8/2004 | Snavely et al. | 1/1 |
| 6,886,134 B1 * | 4/2005 | Cason | 715/760 |
| 6,947,063 B1 * | 9/2005 | Cirulli et al. | 715/851 |
| 6,950,852 B1 * | 9/2005 | Kobayaghi et al. | 709/204 |
| 6,950,983 B1 * | 9/2005 | Snavely | 715/206 |
| 6,965,938 B1 * | 11/2005 | Beasley et al. | 709/229 |
| 6,978,445 B2 * | 12/2005 | Laane | 717/131 |
| 7,013,289 B2 * | 3/2006 | Horn et al. | 705/26 |
| 7,062,709 B2 * | 6/2006 | Cheung | 715/513 |
| 7,133,868 B1 * | 11/2006 | Ruest et al. | 1/1 |
| 7,162,717 B1 * | 1/2007 | Harris | 717/168 |
| 7,197,480 B1 * | 3/2007 | Chollon et al. | 705/27 |
| 7,272,659 B2 * | 9/2007 | Fukuoka | 709/231 |
| 7,287,036 B2 * | 10/2007 | Kusumoto et al. | 1/1 |
| 7,480,698 B2 * | 1/2009 | Potter | 709/217 |
| 7,523,191 B1 * | 4/2009 | Thomas et al. | 709/224 |
| 7,593,854 B2 * | 9/2009 | Belrose | 704/270.1 |
| 2002/0019834 A1 * | 2/2002 | Vilcauskas et al. | 707/501.1 |
| 2002/0023258 A1 * | 2/2002 | Elwahab et al. | 717/122 |
| 2002/0087686 A1 * | 7/2002 | Cronk | 709/225 |
| 2002/0104096 A1 * | 8/2002 | Cramer et al. | 725/113 |

(Continued)

OTHER PUBLICATIONS

Handling Frames with Flash Buttons, Oct. 23, 2002, evolt.org, http://lists.evolt.org/archive/Week-of-Mon-20021021/125228.html.*

(Continued)

*Primary Examiner* — Boris Pesin
*Assistant Examiner* — John Heffington
(74) *Attorney, Agent, or Firm* — Ropes & Gray LLP

(57) ABSTRACT

Browser frames residing on different domain servers may exchange information indirectly without compromising security that ordinary restricts frame to frame communication. The first browser frame causes the browser to generate a notification of a change of state of the browser frame. The browser sends the notification, together with data values from the content of the first browser frame, to a domain server that hosts the second frame. The server software running on the domain server receives and interprets the notification and data values, and updates the content of the second frame according to the interpretation. The domain server then sends the updated content back to the browser that issued the notification. The browser displays the updated content in the area allocated to the second frame.

34 Claims, 5 Drawing Sheets

U.S. PATENT DOCUMENTS

| | | | | |
|---|---|---|---|---|
| 2002/0152222 | A1* | 10/2002 | Holbrook | 707/104.1 |
| 2002/0156688 | A1* | 10/2002 | Horn et al. | 705/26 |
| 2002/0188862 | A1* | 12/2002 | Trethewey et al. | 713/201 |
| 2003/0023670 | A1* | 1/2003 | Walrath | 709/203 |
| 2003/0025727 | A1* | 2/2003 | Rath et al. | 345/744 |
| 2003/0066031 | A1* | 4/2003 | Laane | 715/513 |
| 2003/0074634 | A1* | 4/2003 | Emmelmann | 715/513 |
| 2004/0024843 | A1* | 2/2004 | Smith | 709/219 |
| 2004/0070603 | A1* | 4/2004 | Gerra et al. | 345/738 |
| 2004/0117409 | A1* | 6/2004 | Scahill et al. | 707/200 |
| 2004/0117804 | A1* | 6/2004 | Scahill et al. | 719/320 |
| 2004/0158617 | A1* | 8/2004 | Shanny et al. | 709/217 |
| 2004/0172465 | A1* | 9/2004 | Shuster et al. | 709/223 |
| 2004/0181467 | A1* | 9/2004 | Raiyani et al. | 705/28 |
| 2005/0050021 | A1* | 3/2005 | Timmons | 707/3 |
| 2005/0050454 | A1* | 3/2005 | Jennery et al. | 715/513 |
| 2005/0071464 | A1* | 3/2005 | Kuwata et al. | 709/224 |
| 2005/0138136 | A1* | 6/2005 | Potter | 709/217 |
| 2005/0246659 | A1* | 11/2005 | Mengerink et al. | 715/808 |
| 2006/0010134 | A1* | 1/2006 | Davis et al. | 707/10 |
| 2006/0015594 | A1* | 1/2006 | Kontamsetty et al. | 709/221 |
| 2006/0031497 | A1* | 2/2006 | Beartusk et al. | 709/225 |
| 2006/0136309 | A1* | 6/2006 | Horn et al. | 705/26 |
| 2006/0190619 | A1* | 8/2006 | Tenembaum et al. | 709/233 |
| 2007/0250841 | A1* | 10/2007 | Scahill et al. | 719/320 |
| 2008/0270577 | A1* | 10/2008 | Walrath | 709/219 |
| 2009/0019111 | A1* | 1/2009 | Emmelmann | 709/203 |

OTHER PUBLICATIONS

Mark Wutka, Special Edition Using java Server Pages and Servlets, Oct. 20, 2000, Que, ISBN 0-7897-2441-3.*

Matthew Pizzi et al., Macromedia® Dreamweaver® MX Unleashed, Que, Dec. 13, 2002, ISBN 0-672-32446-6.*

About JavaScript, http://javascript.about.com/library/bltarget.htm.*

Pizzi et al., Macromedia® Dreamweaver® MX Unleashed, Que.*

Woychowsky, HTML frames can reduce traffic, Aug. 16, 2002, http://articles.techrepublic.com.com/5100-10878__11-1044774.html.*

Tessier, Sharing Data Between Web Page Frames Using JavaScript, http://www.ddj.com/article/printableArticle.jhtml?articleID=184409884&dept_url=/.*

Web Authoring FAQ: HTML Frames, http://web.archive.org/web/20031203051609/http://www.htmlhelp.com/faq/html/frames.ht . . . .*

Holzschlag, Special Edition Using HTML 4, Sixth Edition, Que.*

Query String, Webopedia.com, http://web.archive.org/web/20021216062236/http://www.webopedia.com/TERM/Q/query_. . . .*

About JavaScript, http://web.archive.org/web/20050521005855/http://javascriptaboutcom/library/bltarget. htm, 2005.*

Pizzi et al., Macromedia® Dreamweaver@ MX Unleashed, Que, Dec. 13, 2002.*

Woychowsky, HTML frames can reduce traffic, Aug. 16, 2002, http://articles.techrepublic.com.com/5100-10878__11-1044774.html, Aug. 16, 2002.*

Tessier, Sharing Data Between Web Page Frames Using JavaScript, http://www.ddj.com/article/printableArticle.jhtml?articleID=184409884&dept_url=/, May 1, 1996.*

Web Authoring FAQ: HTML Frames, http://web.archive.org/web/20031203051609/http://www.htmlhelp.com/faq/html/frames.ht . . . , 20 Oct. 2001.*

Holzschlag, Special Edition Using HTML 4, Sixth Edition, Que, Dec. 21, 1999.*

Query String, Webopedia.com, http://web.archive.org/web/20021216062236/http://www.webopedia.com/TERM/Q/query-. . . , Apr. 22, 2002.*

Flanagan, D. JavaScript: The Definitive Guide. Fourth Edition (O'Reilly & Associates, Inc., Sebastopol, California 2002), chapter 21.3, pp. 402-403.

PCT5052994, PCT-ISA-220, PCT-ISA-221, PCT-ISA-237.

* cited by examiner

METHOD AND SYSTEM FOR COMMUNICATING AND EXCHANGING DATA BETWEEN BROWSER FRAMES

BACKGROUND OF THE INVENTION

This invention relates to Internet browsers, and more particularly to facilitating communication between two frames in a single browser window where the two frames display Internet content from two different domain servers.

With the spread of the Internet in everyday life, more and more tasks are performed online. The Internet, and particularly the World Wide Web, is used among other things for shopping, paying bills, requesting and qualifying for loans for a number of different products ranging from consumer goods and credit cards to automobiles and mortgages.

As consumers, corporate entities and government increasingly use the online services available through the World Wide Web, companies have discovered that the Internet is a lucrative medium to advertise their products. The Internet gives an advantage over regular advertising, in that it can target the advertisements depending on the content that the user is viewing. Thus advertisers can offer related services, or competitive products at competitive prices, by monitoring what content a user is viewing, and by tailoring the displayed advertisements based on that content or on the information a user is submitting to the Web.

One way of achieving such directed advertising is through the use of frames in a browser window. If the user is entering information or viewing certain content in one frame, a program can monitor that information or content and display related—or competitive—advertisements or offers in another frame in the same browser window.

Apart from advertising, users may prefer to see multiple results in the same window—another option when using different frames in the same window. The results displayed in one frame are often dependent on the information entered into another frame. Similarly, often an action in one frame, such as clicking a button, needs to cause a change of the displayed results in another frame. The use of frames allows the advertisement, offer or multiple search result pages to be displayed simultaneously in separate frames. A user can also independently manipulate frames by entering information, or scrolling or changing the displayed content, while simultaneously viewing information displayed in different frames.

One challenge in implementing such an interdependent frame display model is that often the advertising, competitive offer or search result to be displayed in a frame depends on data stored on a domain server different than the domain server of that displaying frame. In order to display directed advertising or a competitive offer, or in order to display in one frame search results based on information entered in another frame, an action taken in the frame where information was entered has to affect the displaying frame—i.e., the frames need to communicate with each other. If all content is served from the same domain server, communication between frames is not a problem. However when the contents of the different frames reside on different servers, the communication between them has heretofore been seriously restricted because of security concerns.

Browsers restrict direct exchange of information between objects, including frames, residing on different domains. For security reasons frames from one domain server do not have access to the properties or information of frames residing on a different domain server. Browsers do not allow a read-out in one frame of information from other frames if those other frames come from different servers. Further, when loading an object such as a page or a frame from one server, a script loaded from a different server cannot get or set certain properties of certain browser and HTML objects in a window or frame.

The domain servers themselves can communicate with each other and exchange information because they can use protocols other than browser-based protocols that are subject to the aforementioned security restriction. And a browser frame can send a request to a server other than its own server. However, neither that browser frame nor that server can cause such information to be directly displayed in a frame other than the one that made the request, because the Internet is a "pull-based" system. In other words, a page or content is not delivered or displayed until a browser requests it and the content is delivered to the point of request. The opposite of "pull" is "push", where data is sent to a receiving browser without the receiving browser issuing a request. Although domain servers can push information to each other, and windows or frames can push information to numerous domain servers, such information cannot be displayed directly—the browser must first pull it. If two frames residing on different servers need to communicate, the initiating frame can cause its domain server to push the information onto the domain server of the target frame. However, the browser displaying the target frame needs to pull that content in order to display it.

It would be advantageous to be able to provide a system that would allow frames residing on different servers to communicate and to cause a browser to display content in one frame ("target frame"), which content is based on an action in, or information received from, the other frame ("initiating frame").

SUMMARY OF THE INVENTION

It is the object of the present invention to provide a system that would allow frames residing on different servers to communicate and to cause a browser to display content in a target frame, which content is based on an action in, or information received from, an initiating frame.

In a pull-based system such as the World Wide Web, in order for a frame to initiate an action in a different frame residing on a different server, the initiating frame cannot simply request the action, or send the data to the other frame's server. The initiating frame also has to cause the target frame to pull and display the information, or to perform the requested action. The initiating frame cannot push the information onto the display of the target frame, and the second frame does not know that it needs to pull it. Communication needs to be implemented by the initiating frame somehow triggering a pull directed to the target frame.

The present invention achieves just that by initiating a series of actions that ultimately cause the target frame to display content or initiate events based on the content of the initiating frame, or an event originating on the initiating frame. According to the present invention the initiating frame generates requests for communication and triggers a pull from the domain server for the target frame. The target frame's domain server then causes the requested action to occur on the target frame by manipulating its content. The pull triggered on the target frame by the initiating frame causes the target frame content to be displayed in the target frame in the normal way.

Thus, in accordance with the present invention, there is provided a method and a system for communicating between browser frames, where the browser frames are part of one frameset element served by a first domain server, and where at least one of the browser frames is served by a second domain server different from the first domain server.

The method of the invention includes generating a notification of a change of state of a first browser frame served by one of the first or second domain servers, the notification including a Uniform Resource Locator ("URL") call to an address on another of the first and second domain servers. The notification is interpreted on that other one of the first and second domain servers. A change of state of a second browser frame served by that other one of the first and second domain servers is caused in accordance with the interpretation of the notification by that other one of the first and second domain servers.

There is further provided a system including a user-viewable interface device in communication with the first and second domain servers, displaying the browser frames. The interface device runs software including frameset element logic that defines and controls the properties of the browser frames, and that causes the display of content of the browser frames on the interface device. A portion of the software logic is adapted for execution upon a change of state of the first browser frame served by one of the first and second domain servers, and for delivering a notification of the change of state to another of the first and second domain servers. That other one of the first and second domain servers runs software adapted to receive and interpret the notification, and to update the content of the second browser frame according to the notification, and to return the updated content to the frameset.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
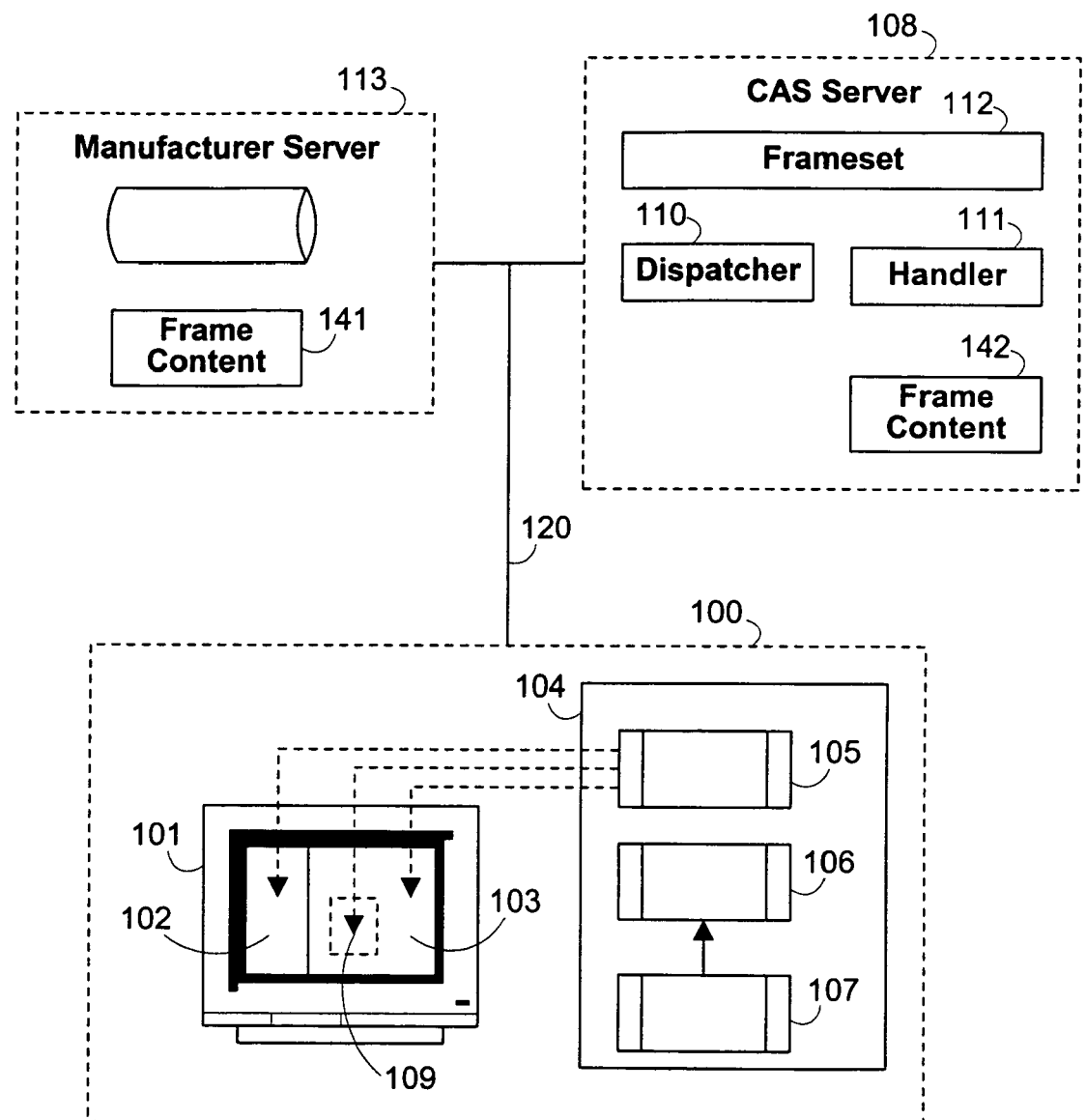
FIG. 1 is a diagram of a preferred embodiment of a system according to the invention.

The present invention allows frames that are served from different domains to at least appear to communicate with each other. The present invention provides the functionality of communication between such frames without circumventing the security prohibition against frames served from different domains being able to access each other's properties or content. The present invention allows such communication to be implemented indirectly by one or more pulls from the domain server for the target frame.

As used herein the term "communication" includes causing an action to occur on the target frame where such action is dependent on, or occurs in response to an event, action, user entry, change of information or the like, occurring in the initiating frame.

The event, action, user entry, etc. that can trigger the communication, or change in state of a frame, preferably includes, without limitation, any loading or unloading of a frame, the act of user entry, change of the content of the frame, or recalculation or reevaluation of information on the local computer or on a independent remote computer. It also preferably includes any of the predefined events associated with an HTML frame object, or JavaScript™, as known in the art, or any other commercially available or custom software used with a browser. This list is not exclusive and one skilled in the art will appreciate that there may be numerous other ways to trigger a response or an action.

The change of state being triggered on the target frame as a result of the change of state on the initiating frame preferably includes, without limitation, the actions of generating events on the target frame, executing programs, changing content or display, recalculating or reevaluating information, or any other action that may occur to a person skilled in the art.

The present invention preferably can be used with numerous browser platforms as will be apparent to those skilled in the art. Among those, without limitation, are Internet Explorer™, Netscape™, Opera™, Mosaic™ and others. The invention also preferably can be implemented using a variety of scripting or programming languages, such as Java™, JavaScript™, JScript™, "XML", "C", "C++", Perl, or any combination of them.

The purpose of this invention is to cause change in the state of a target frame, based upon a change in the state of an initiating frame where the initiating frame and the target frame are served from different domain servers. In accordance with the invention, however, the initiating and target frames preferably have a common parent element. In a preferred embodiment the common parent element is an HTML frameset element. The logic of the frameset element creates the frames and directs the properties of the frames to the appropriate location on each frame's respective server. At least one frame is served from a different domain server than the frameset element.

In order to cause the change of state in the target frame as described earlier, the target frame has to be notified of a change of state of an initiating frame. Because the contents of the frames reside on different domains, the browser precludes the initiating frame from directly accessing the target frame. Similarly the target frame cannot "probe" the initiating frame in order to obtain information about its properties, content or state.

Logic for any frame defined in a browser can access any domain server, and not only the domain server serving that frame. The logic also can cause the browser to extract information from a domain server and display it. The logic can also write data to a domain server, but those data will not be displayed until the browser pulls the data.

Software commands associated with a frame, executed from the logic of a frameset element, direct the browser to the location from which to display the content of each frame. Such software commands incorporating URLs send data to the domain server designated in the URL, and then receive data returned by the domain server. The browser then displays on a user interface device the received data, in the frame which is associated with the command.

Additionally, the domain servers for each frame can communicate with each other via network or other connections. The initiating frame can notify the domain server of the target frame of a change of status. The target frame's domain server then can change the content of the target frame. The changed content, however, cannot be displayed on the target frame until the browser pulls it from the domain server.

A frame can call and load a browser page from any server through a URL call. The newly loaded page can then directly exchange information with, or cause an action, or a change of state, on any frame served from the same server as the newly loaded page. The newly loaded page can also cause a frameset served from the same domain server to update the frame display for any frame defined in the frameset, regardless of what domain serves the frame to be updated, because the frameset can issue URL calls on behalf of its constituent frames.

The present invention utilizes the above described capabilities of browsers and programming languages to allow communication between frames residing on different domain servers. In one aspect of the invention when the initiating frame changes state it notifies the target frame's domain server of the change by sending data to describe the change. The target frame's domain server receives the notification with the data and accordingly updates the content of the target frame stored there. The initiating frame, either simultaneously or in sequence with the above actions, directs the browser to initiate a pull in order to update the display of the target frame with the updated content.

In another aspect of the invention the initiating frame, through a URL call, pulls a browser page from the target frame's domain server. The browser page may be a blank page with logic that is executed when the browser page is loaded. When the initiating frame calls the browser page, depending on the browser used, or the type of URL call utilized, the initiating frame may unload and the browser page may replace the initiating frame in the window, or leave the browser window empty when the browser page is a blank page. When preserving the appearance of continuity is desired, the logic being executed on the browser page may invoke a "Back" HTML command, or its equivalent. Upon execution of such command logic the initiating frame will be reloaded into the browser window and only a flicker may be observed, if at all.

In another preferred embodiment, the flicker can be avoided by the initiating frame preferably calling an event on a hidden frame, which in turn through a URL call, pulls a browser page from the target frame's domain server. The browser page may be similar or identical to the browser page described in connection with the previous embodiment—i.e., a blank page with logic that is executed when the browser page is loaded. The hidden frame is preferably part of the same frameset element as the initiating and target frames. The browser page preferably is loaded in the hidden frame, and when the browser page logic executes, the browser page unloads. Because the browser page preferably loads and unloads in a hidden frame, the loading and unloading is not observable by the user.

Because the browser page in these two embodiments is served from the target frame's domain server, the logic on that browser page can access directly the target frame. The browser page can assign values to different properties of the target frame or the browser page can force the occurrence of an event on the target frame, as if the event had actually occurred. The browser page may also be able to cause other actions or changes on the target frame as would be apparent to one skilled in the art.

The browser page, when called from the same domain server as the frameset, as in this embodiment, preferably causes the frameset element's logic to update the display of, or refresh, any frames defined in the frameset element. The URL call from the initiating frame to load the browser page may include parameters in the URL address line. The browser page logic may interpret those parameters, or it may be programmed with a predefined logic that is independent of the parameters, if any.

This invention is useful when it is desired that a target frame update its content or perform some action based on the content of an initiating frame. It is therefore important that an initiating frame notify a target frame of the initiating frame content. In one embodiment of the invention the content of the initiating frame needs to be communicated to the target frame only upon the occurrence of an event or user action, it being assumed that otherwise no change of content has occurred.

This invention preferably uses event driven actions to initiate the communication. A frame is an object, and as such it may have a number of events associated with it as known in the art. The universe of possible events will depend on the scripting or programming language used. Some common events are "on Load," "onunload" and "on Click," among others. Those events cause certain logic to be executed when the frame loads in the browser window or unloads from it, or when the user clicks anywhere within the frame. An event may also be generated when the user enters text in a text box, or positions or drags the cursor over an area of the frame. The occurrence of an event may indicate a change in the state or content of the initiating frame. Therefore it is important to notify the target frame of the event, and of the content or state of the initiating frame. There may not be any change of the content of the initiating frame when an event occurs, but the target frame may still be notified and provided with the important parameters.

The request for communication can be generated in numerous ways, other than preprogrammed events, that will be apparent to a person skilled in the art. Those may include scripts, external programs, time-based requests, external network events, hardware events, interrupts and many others. Those actions may initiate a request for communication to the target frame, and may send certain parameters based upon the type of the initiating action.

Once the request is generated, the initiating frame logic preferably will trigger a URL call to the target frame's server. In one embodiment, when the initiating frame resides on the same server as the frameset element, certain intermediate logic is executed which initiates the URL call. The URL address line may contain parameters representing certain values from the content of the initiating frame. The intermediate logic may be part of the frame or frameset logic, a separate function, subroutine or subprogram, or even a separate executable program, among other things. The intermediate logic preferably will generate the URL address line with the necessary parameters, and indicate to the control logic of the frameset element that content received from the address indicated in the URL address line is to be displayed in the target frame.

Alternatively, such as in an embodiment where the target frame resides on the same server as the frameset element, the intermediate software may not be needed and the pull from the other server may be initiated upon generation of the request directly from the frame's logic by executing a separate command.

In one such embodiment, the user can click a button on the initiating frame, desiring to load data from the content of the target frame, process the data and then display the result in the target frame. When the user clicks the button on the initiating frame, the corresponding "onclick" event preferably pulls a blank browser page from the domain server of the target frame. The initiating frame preferably triggers the pull through a URL address call. The blank browser page executes preprogrammed logic when loaded. The logic forces an event on the target frame, such as a click on a hidden button. (By executing the appropriate software command, as known in the art, the browser page can simulate the button click event, as if the user actually clicked on the button.) The blank browser page preferably then executes an HTML "Back" command to unload the blank page and re-display the initiating frame. The user should not observe a change of state, beyond at most a flicker, because the loading of the browser page and the reloading of the target frame normally occur very quickly. This gives the appearance that the user's click in the initiating frame caused the desired action in the target frame, without any apparent change in the initiating frame.

In another embodiment, even a flicker may be avoided altogether by loading the blank browser page in a hidden frame. In one such embodiment the frameset may be programmed to include another frame, preferably a hidden frame. When the user clicks a button on the initiating frame, the corresponding "onclick" event preferably is programmed to cause that hidden frame to pull a blank browser page from the domain server of the target frame. The "onClick" event may trigger an event on the hidden frame, which event in turn preferably through a URL call pulls and loads the blank page in the hidden frame. The browser page preferably is the same one as described earlier and events that follow, including the simulated click on a hidden button generated on the target frame, are preferably the same as described above.

The event on the target frame—the simulated click on a hidden button—causes the execution of a portion of software which accesses data on the domain server and initiates the required manipulation upon the data. If desired, this portion of software, or the browser page logic, can cause the frameset logic to refresh the display of the target frame.

In one preferred embodiment, the present invention maybe used in a Credit Aggregation System ("CAS") that allows automobile dealers to access multiple financing sources when conducting a customer financing transaction. The user interface for the CAS is divided into two frames—one frame that displays any selected finance source and executes the financing application, and a second frame that displays branding information of the automobile manufacturer with which the dealer is affiliated.

The system preferably is entered through a portal provided to the dealer by the manufacturer and preferably is designed to appear as though the CAS application is running in a frame within a branded interface provided by the manufacture. However, for reasons discussed below, the frameset element resides on the same domain server as the CAS application frame ("CAS Server"). The branded portal frame preferably resides on a domain server, different from the CAS server, which preferably is a server run by the manufacturer. The manufacturer may provide offers and advertising on its browser frame based on information entered in the CAS frame.

Although normally one would expect the frameset and the branded portal to reside on the same server, with the CAS application running in its frame inside the frameset but served from the CAS provider's server, for reasons that will be clear below, in this preferred embodiment the frameset resides on the CAS provider's server. However, because the frameset controls the appearance of the branded portal, the frameset must be written by the manufacturer associated with the branded portal, but to specifications defined by the CAS provider. Thus each manufacturer will provide its own frameset element to the CAS provider to be loaded onto the CAS server. Any given dealer preferably will enter the CAS system through a portal page on its associated manufacturer's server, and that will let the CAS server know which frameset to use to provide the CAS application to the dealer, so that it appears to the dealer that the system is being served by the dealer's associated manufacturer (or the manufacturer's credit arm).

The CAS application preferably operates on an event/event-listener model for this approach. Events are triggered in the manufacturer's frame when certain data are entered in the CAS area. When events occur in the CAS frame, the CAS application calls an event dispatcher function in the frameset element. The event dispatcher calls a handler function, when available, with the data. The handler function sends a URL to the manufacturer's backend (which is the actual server process as opposed to the front end which is the user interface), targeting the manufacturer's portal frame. The manufacturer's portal frame then displays the new content.

For example, an automobile purchaser may be interested in purchasing a particular automobile. The dealer will enter the purchaser's information in the CAS area of the user interface. The information may include the desired make and model of the automobile. Once the dealer enters the information and submits it to the server by clicking, the dispatcher function is executed, and a URL address line is sent to the manufacturer's server targeting the manufacturer frame. The URL address line contains values from the content of the CAS area, such as the make and model of the automobile. Upon receipt of those values, the manufacture's server will return specific content that may include offers for low rate financing for that particular make or model through the manufacturer's finance arm, or for special deals associated with that make or model. The returned content will then be displayed in the manufacturer's portal frame.

The event dispatcher and handler functions preferably are programmed using JavaScript™ in the parent frameset element. The event dispatcher function preferably is the main interface that is used to communicate all events to the target frame's server. When an event occurs in the CAS frame, the CAS application preferably packages the context information, including the event ID, from the frame into a Jscript™ object and calls the dispatcher. The CAS application preferably passes the JavaScript™ object to the dispatcher as a function parameter.

All events within the CAS application preferably are pre-defined and given an event ID. Each event preferably is associated with an event handler—a function which assigns a URL address to the location property of the manufacturer's portal frame. If such event handler is not pre-programmed the particular event is ignored. For all major modules of the CAS application, the CAS application preferably calls the dispatcher, on an "on Load" event for any page in the module, with the object passed to it containing the module ID. The CAS application also passes a page ID with the module ID if the manufacturer application is interested in more detail.

The dispatcher JavaScript function preferably checks for the event by extracting the event ID from the packaged object passed to it. When the event ID has a handler associated with it, the dispatcher preferably executes the appropriate handler. If the user re-visits a page with an event, the event preferably is executed again with the parameters.

An example of the code of the frameset element that defines the two frames and controls their properties is shown below:

```
<frameset cols="25%, 75%">
    <frame id="frame0" name="MFRFrame"
        src="http://mfr.financing.com/index.html">
    <frame id="frame1" name="CASFrame"
        src="http://CAS.server.com/index.html">
</frameset>
```

As known in the art the above logic will define and create the two frames that will split the user interface display into two portions of 75% of the width of the screen and 25% respectively. The "src" property associated with each frame is an HTML property indicating the initial location from which to load the frames.

Sample HTML and JavaScript code for the dispatcher and handler functions is provided below:

```
<html>
<head>
<script language="JavaScript ver. ">
        //Provides JavaScripts for handling the event
        notifications sent from the CAS application
    function applicantHandler (EventObj) {                              (1)
        var param1 = EventObj.param1                                    (2)
        var param2 = EventObj.param2                                    (3)
            //call the Financing Service and pass the //required
            values
        MFRFrame.location = https://mfr.financing.com/                  (4)
            FinancingService?param1=val1&param2=val2
    }
    function incentiveHandler (EventObj) {                              (5)
        //call the Financing Service and pass the //required
        values
    }
    function dispatcher (EventObj) {                                    (6)
        //Switch to appropriate event handler based on the
        event id
            if (EventObj.eventID == 1) {                                (7)
                applicantHandler (EventObj);
            }
            else if (EventObj.eventID ==2) {                            (8)
                incentiveHandler (EventObj);
            }
    }
CASFrame.onLoad = dispatcher;                                           (9)
</script>
</head>
```

The above portion of software is written using JavaScript™, but the same result can be achieved using different programming or scripting languages as is common in the art. Line (9) above makes the dispatcher function the default handler for the CAS frame "on Load" event. Whenever the CAS frame loads, the dispatcher function will run. The logic for the dispatcher function is shown starting at line (6) above. It receives an object as a parameter—Eventobj. Based on the type of event that occurred, in this example for simplicity the event ids are shown as 1 or 2, a handler function will be executed. Sample code for a handler function is shown beginning on line (1) above. Each handler function is pre-programmed to extract certain values from the EventObj parameter as shown on lines (2) and (3). The handler function than assigns a URL address to the location property for the Bank application frame. The location property is a windows property used by JavaScript™ and is similar to the "src" property described earlier, which is used by HTML to load the frame content initially. The URL address assigned to the frame location property in the handler function has the values extracted from the EventObj parameter appended to it as shown on line (4).

The invention may be considered in connection with the embodiments illustrated in the FIGS. 1-4.

FIG. 1 shows a system which allows frames served from different domain servers to communicate with each other and exchange information. Frameset element logic 112, which includes a dispatcher function 110 and handler function 111 (not visible to the user, but shown in the logical "location" within the frameset), preferably is served from domain server 108. The user interface device in this embodiment preferably is a computer 100 which runs a browser 104. The browser downloads the frameset element logic 112, together with the dispatcher 110 and handler functions 111, from domain server 108. The browser then executes, on the local computer 100, copies—indicated as 105, 106 and 107 respectively—of the frameset 112, handler 111 and dispatcher 110 functions. The content 141 of frame 102 (the manufacturer frame) preferably resides on domain server 113 and preferably is provided to the browser 104 via network connection 120. The content 142 of frame 103, the CAS frame, resides on domain server 108 and preferably is provided to the browser 104 also via the network connection 120. The browser 104, via the frameset 105, preferably displays the contents 141 and 142 of the frames 102, 103 on monitor 101. Another embodiment may include an optional third frame 109, which may be hidden and thus may be used to perform tasks that are invisible to the user. In yet another embodiment (not shown), the local computer 100 may also serve as both the domain server 108 and the user interface device.

Figure 2:
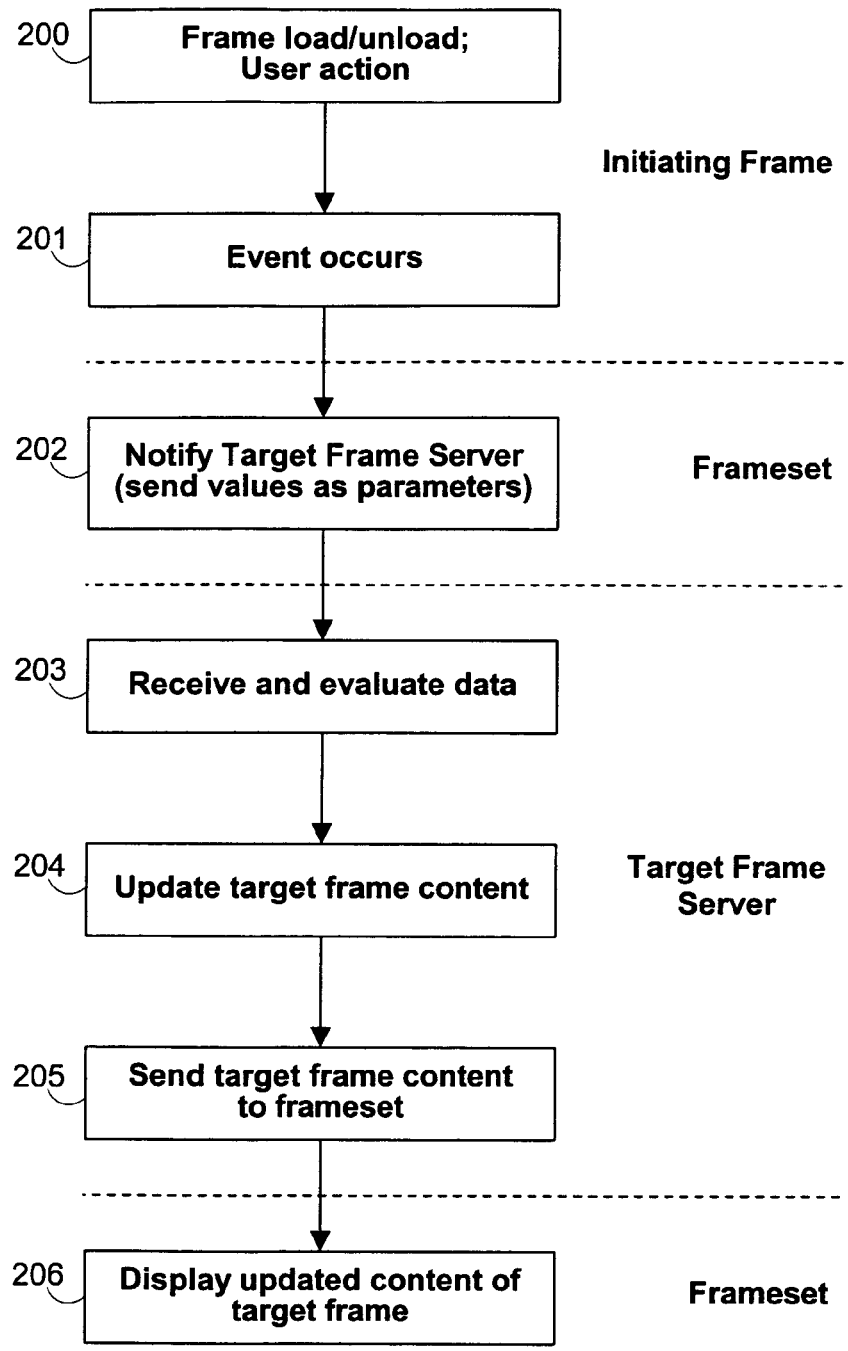
FIG. 2 is a simplified flowchart of a method according to the invention.

FIG. 2 illustrates in a high-level flow chart a method for communication and data exchange between two browser frames that reside on different domain servers. The method starts at step 200, which represents the loading or unloading of a browser frame, user entry, mouse click within the frame or other action. When any of the actions in step 200 occur, an event 201 is generated. Following the occurrence of event 201, in step 202, the frameset logic notifies the domain server for the target frame of the occurrence of event 201. In step 203 the domain server of the target frame receives and evaluates the notification and then updates the content of the target frame in step 204. The updated content is then sent back to the frameset element in step 205. Upon receipt of the updated content, in step 206, the frameset logic displays the updated content in the target frame.

Figure 3:
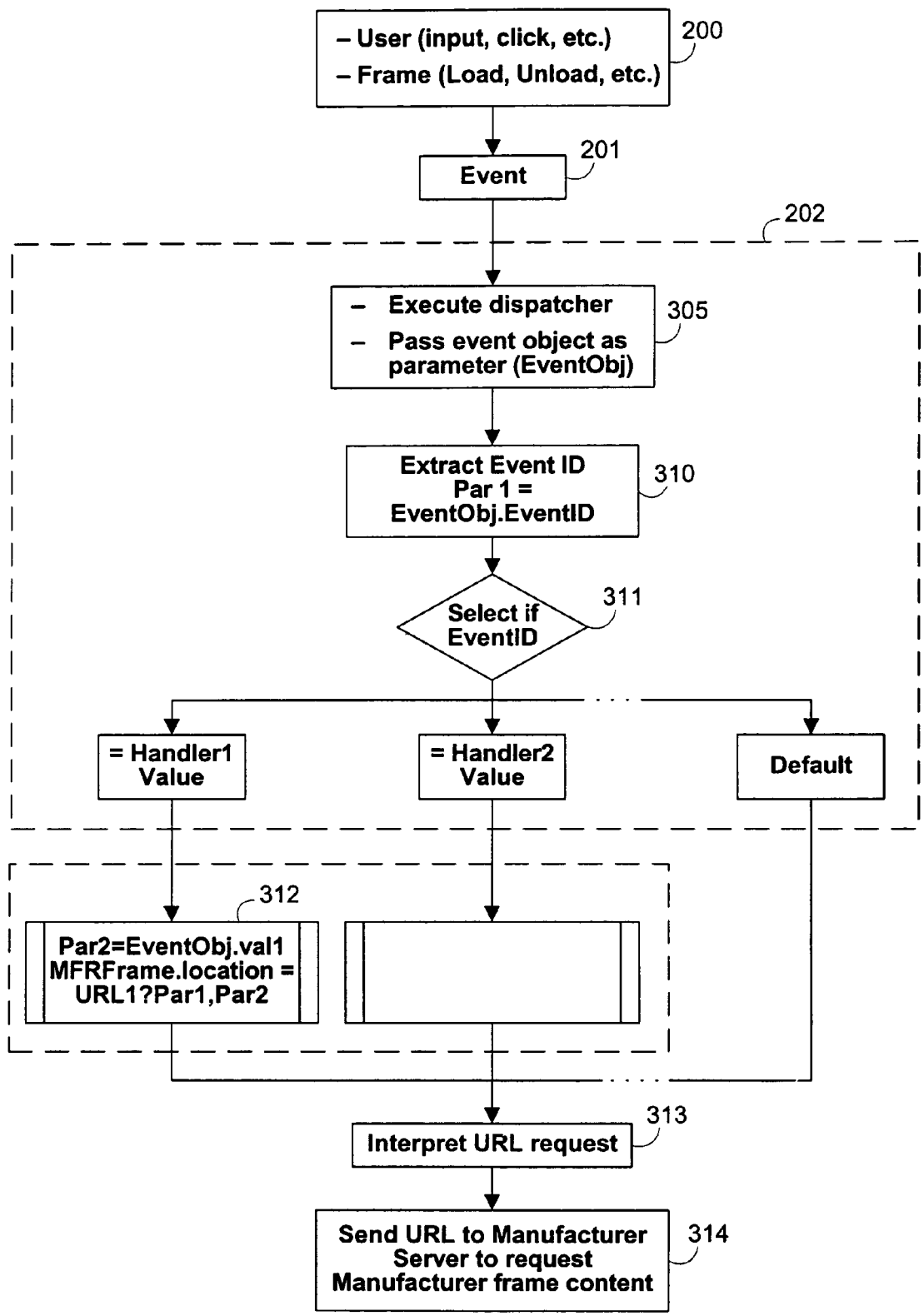
FIG. 3 is a detailed flow chart of one preferred embodiment of the invention.

FIG. 3 illustrates in greater detail steps 200-202 of FIG. 2, and more particularly notification step 202, for one preferred embodiment of the invention, where the initiating frame and the frameset element are served from the same domain server. In this embodiment the initiating frame may be the CAS frame and the target frame may be the manufacturer frame. In step 305, the frameset element triggers the execution of a dispatcher function upon the occurrence of event 201. The dispatcher is passed as parameter an object containing the properties of event 200 and values from the content of the initiating frame. For example, those values may be the make and model of an automobile as described earlier. The logic of the dispatcher function parses the parameter object and extracts the event ID in step 310. The dispatcher then executes a select statement 311 that compares the extracted event ID to values associated with a predetermined number of handler functions.

When the selection logic in step 311 determines that the event ID is equal to a value associated with a handler function, that handler function is executed in step 312. The handler function assigns to the location property of the target frame a preprogrammed URL address pointing to the domain server for the target frame. The URL address line may contain parameters which represent values that may be communicated to the target frame. Those values also may extracted from the parameter object and may be associated with the user entry as described above—i.e., automobile make and model.

Upon assigning a value to the location property of the target frame, the browser interprets the location property in step 313. In step 314 the browser sends a request to the domain server of the target frame, requesting it to deliver the content residing at the URL address generated by the handler function in step 312. The request may also include the values extracted from the parameter object in step 312. The domain server of the target frame receives the request and interprets the parameters in step 315. The domain server then sends the updated content back to the requesting frameset as described earlier with reference to FIG. 2.

When the selection logic in step 311 does not encounter a value associated with a handler function that is equal to the event ID, the preprogrammed handler functions may not be executed and the location property of the target frame may not be assigned. Thus no requests may be sent to the domain server of the target frame.

Figure 4:
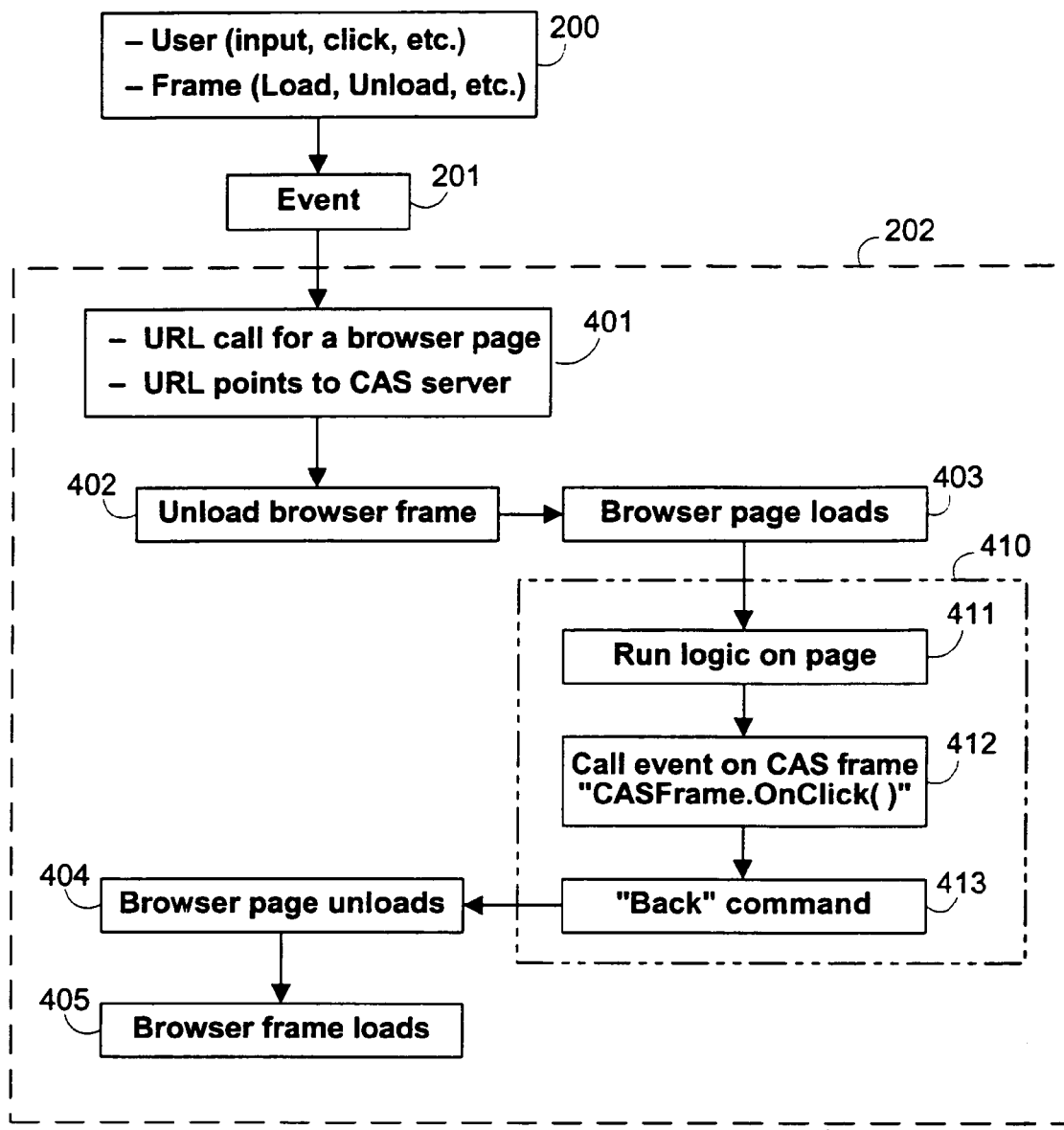
FIG. 4 is a detailed flow chart of another preferred embodiment of the invention.
Figure 5:
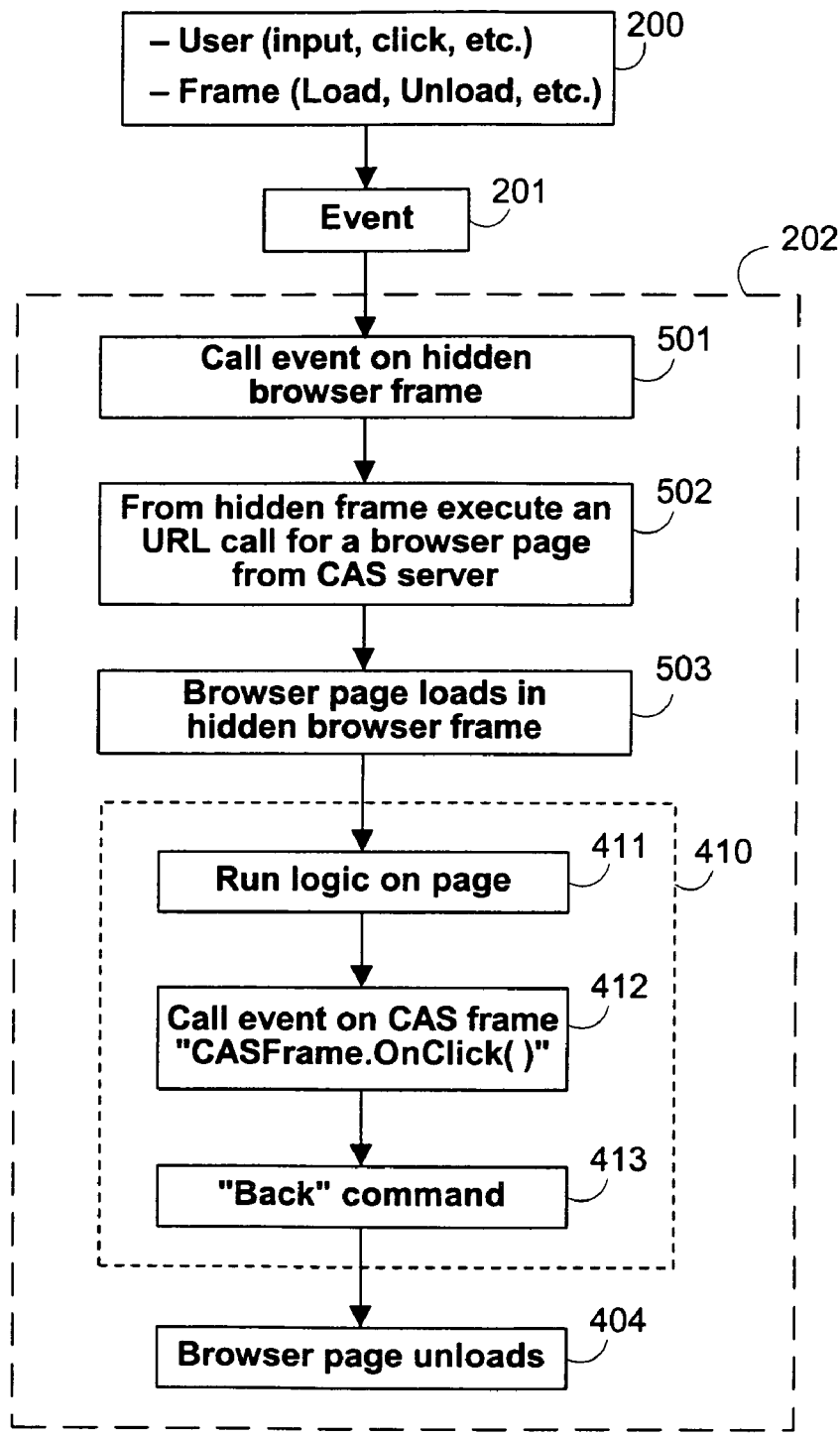
FIG. 5 is a detailed flow chart of another preferred embodiment of the invention.

FIGS. 4 and 5 illustrate in greater detail steps 200-202 of FIG. 2, and more particularly notification step 202, for two other preferred embodiments where the target frame and the frameset element reside on the same server. In these examples a user action in the initiating frame, causes an event to occur in the target frame.

In the embodiment depicted in FIG. 4, the occurrence of event 201 triggers a call to a URL address in step 401. The URL points to a browser page 410 which is served from the domain server for the target frame. In the next step 402, the initiating frame unloads, and then in step 403, browser page 410 loads. When loaded, page 410 executes its logic in step 411, 412 and 413. The browser page logic can access the target frame, because both the browser page 410 and the target frame reside on the same domain server. In step 412, the logic of page 410 forces an event in the initiating frame, as if the underlying action for the event had actually occurred. In this example the logic in step 412 simulates a user click on a button in the target frame. The logic of page 410 then ends in step 413 by executing an HTML "Back" command, or equivalent, which unloads page 410 in step 404, and re-displays the initiating frame in step 405.

Browser page 410 may be a blank page, such that nothing may be displayed on the screen from step 403 until the initiating frame reloads in step 405. In reality however, the user may not observe any change in the appearance of the initiating frame because the loading of the browser page and the reloading of the target frame normally occur very quickly.

FIG. 5 illustrates a preferred embodiment that eliminates the loading and re-loading of the target frame by utilizing a hidden browser frame part of the same frameset element as the target and initiating frame. In this embodiment event 201 triggers another event 501 on the hidden frame. Event 501 in turn utilizes a URL call to load a browser page 410 from the domain server of the target frame. Because the browser page 410 loads into the hidden frame, and the target frame does not load or unload, any possibility for the user interface to "freeze" and display only the blank page is eliminated.

The embodiments described in FIGS. 4 and 5 may be useful with respect to the previously described example when the CAS application provides functionality not desired or provided by some manufacturers. In this case, the CAS frame may contain a button which, when clicked, provides the desired functionality. The button may be hidden so that it cannot be seen by dealers when the manufacturers they are associated with do not provide that functionality. Those manufacturers who desire that functionality may provide a visible button in their frames. The embodiments in FIGS. 4 and 5 allows a dealer to simulate a click on the hidden button in the CAS frame and invoke the desired action, by clicking on the visible button in the manufacturer frame.

As has been described above, the present invention allows two frames, residing on different servers and defined by one frameset element to communicate with each other and cause certain actions, changes of content, or other events to occur on one frame based on change of state of the other frame. The present invention appears to overcome the prohibition against communication between objects within a browser window that are served from different domain servers.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method for communicating between browser frames, wherein said browser frames are part of one frameset element served by a first domain server, and wherein at least one of said browser frames is served by a second domain server different from the first domain server, said method comprising:
   generating a notification of a change of state of a first browser frame directly served by said first domain server, said notification comprising a URL call to an address on said second domain server;
   transmitting, using said frameset element, said notification to said second domain server, wherein said frameset element is transmitting on behalf of a second browser frame directly served by said second domain server in order to cause a change of state of second browser frame;
   interpreting said notification on said second domain server; and
   causing a change of state of said second browser frame in accordance with said interpretation of said notification on said second domain server by pulling data from said second domain server into said second browser frame.

2. The method of claim 1 wherein communicating comprises causing a change of state of said second browser frame based on said change of state of said first browser frame.

3. The method of claim 2 wherein said change of state of said second browser frame comprises change of displayed content in said second browser frame.

4. The method of claim 2 wherein said change of state of said second browser frame comprises occurrence of an action in said second browser frame.

5. The method of claim 2 wherein said change of state of said second browser frame comprises generation of an event in said second browser frame.

6. The method of claim 1 wherein said change of state of said first browser frame comprises change of displayed content in said first browser frame.

7. The method of claim 1 wherein said change of state of said second browser frame comprises an action occurring in said second browser frame.

8. The method of claim 1 wherein said change of state of said first browser frame comprises an occurrence of an event in said first browser frame.

9. The method of claim 1 wherein said notification of change of state of said first browser frame comprises a URL call to a browser page on said second domain server, which serves said second browser frame.

10. The method of claim 1 wherein said notification is a command in logic of said frameset element indicating an address of said second browser frame.

11. The method of claim 1 wherein said notification comprises:
   calling an intermediate portion of software logic;
   selecting a type of notification depending on a type of said change of state of said first browser frame; and
   initiating a command in logic of said frameset element depending on said selection, said command indicating a content address of said second browser frame.

12. The method of claim 11 wherein said command in said logic of said frameset element is an assignment of a location property of said second browser frame.

13. The method of claim 1 wherein said URL call includes parameters representing values of data in said first browser frame.

14. The method of claim 1 wherein said URL call includes parameters representing a state of said first browser frame.

15. The method of claim 1 wherein said interpreting comprises manipulating parameters of said URL call on said second domain server and changing stored content for said second browser frame in accordance with said parameter values and according to predetermined logic on said second domain server.

16. The method of claim 1 wherein causing a change of state of said second browser frame comprises a display refresh of said second browser frame from said frameset element.

17. The method of claim 1 wherein said frames and said frameset element are programmed using HTML.

18. The method of claim 1 wherein said notification is programmed using JavaScript™.

19. A system allowing communication between browser frames, wherein said browser frames are part of one frameset element served by a first domain server, and wherein at least one of said browser frames is served by a second domain server different from the first domain server, said system comprising:
a user-viewable interface device in communication with said first and second domain servers for displaying said browser frames, said interface device comprising a processor configured to run software comprising:
frameset element logic that controls properties of said browser frames, and that causes display of content of said browser frames on said interface device; and
a portion of software logic adapted for execution upon a change of state of said first browser frame directly served by said first domain server, and for communicating, using said frameset element, a notification of said change of state to said second domain server, wherein said frameset element is communicating on behalf of said second browser frame directly served by said second domain server in order to cause a change of state of said second browser frame; wherein:
said portion of software logic comprises a URL call to a browser page on said second domain server,
said second domain server is adapted to receive and interpret said notification, to update the content of said second frame according to said notification by pulling data from said second domain server, and to return said updated content to said frameset.

20. The system of claim 19 wherein communication comprises causing a change of state of said second browser frame based on said change of state of said first browser frame.

21. The system of claim 19 wherein said change of state of said second browser frame comprises a change of displayed content in said second browser frame.

22. The system of claim 19 wherein said change of state of said second browser frame comprises occurrence of an action in said second browser frame.

23. The system of claim 19 wherein said change of state of said second browser frame comprises generation of an event in said second browser frame.

24. The system of claim 19 wherein said change of state of said first browser frame comprises a change of displayed content in said first browser frame.

25. The system of claim 19 wherein said change of state of said first browser frame comprises an action occurring in said first browser frame.

26. The system of claim 19 wherein said change of state of said first browser frame comprises an occurrence of an event in said first browser frame.

27. The system of claim 19 wherein said portion of software logic further comprises a command in logic of said frameset element indicating an address of said second browser frame.

28. The system of claim 19 wherein said portion of software logic further comprises a dispatcher function running logic comprising:
selecting a type of notification depending on the type of said change of state of said first browser frame; and
sending said notification to said second domain server by executing a command pointing to a content address of said second browser frame.

29. The system of claim 19 wherein said URL call includes parameters representing values of data in content of said first browser frame.

30. The system of claim 29 wherein said second domain server performs said receiving and interpreting by:
manipulating the parameters of said notification on said second domain server; and
changing the stored content for said second browser frame in accordance with said parameter values and according to predetermined logic on said second domain server.

31. A method for communicating between browser frames, wherein said browser frames are part of one frameset element served by a first domain server, and wherein at least one of said browser frames is served by a second domain server different from the first domain server, said method comprising:
generating a notification of a change of state of a first browser frame having a first browser page served by said second domain server, said notification comprising a first URL call to an address on said first domain server;
unloading said first browser page of said first browser frame;
interpreting said notification on said first domain server and providing executable code according to said notification;
loading in said first browser frame a blank browser page served by said first domain server and containing said executable code, said executable code generating an event;
in response to said event, causing a change of state of said second browser frame served by said first domain server in accordance with said executable code; and
reloading said first browser page in said first browser frame in place of said blank browser page.

32. A method for communicating between browser frames, wherein said browser frames are part of one frameset element served by a first domain server, and wherein at least one of said browser frames is served by a second domain server different from the first domain server, said method comprising:
generating a notification of a change of state of a first browser frame having a first browser page served by said second domain server, said notification comprising a first URL call to an address on said first domain server;
interpreting said notification on said first domain server and providing executable code according to said notification;
loading in a third browser frame, said third browser frame being a hidden frame, a browser page served by said first domain server and containing said executable code, said executable code generating an event; and in response to said event, causing a change of state of said second browser frame served by said first domain server in accordance with said executable code.

33. A method for communicating between a first browser frame and a second browser frame served by a first domain server and a second domain server, respectively, wherein said first and second browser frames are part of one frameset element served by said first domain server, said method comprising:

in communications initiated by said first browser frame and targeting said second browser frame:
generating a notification of a change of state of said first browser frame having a first browser page served by said first domain server, said notification comprising a first URL call to an address on said second domain server,
transmitting from said frameset element served by said first domain server said first URL call on behalf of said second browser frame; and
interpreting said notification on said second domain server, and
causing a change of state of said second browser frame having a second browser page served by said second domain server in accordance with said interpretation of said notification; and
in communications initiated by said second browser frame and targeting said first browser frame:
generating a notification of a change of state of said second browser frame having said second browser page served by said second domain server, said notification comprising a second URL call to an address on said first domain server;
unloading said second browser page of said second browser frame;
interpreting said notification on said first domain server and providing executable code according to said notification;
loading in said second browser frame a blank browser page served by said first domain server and containing said executable code, said executable code generating an event;

in response to said event, causing a change of state of said first browser frame served by said first domain server in accordance with said executable code; and
reloading said second browser page in said second browser frame in place of said blank browser page.

34. A method for communicating between a first browser frame and a second browser frame served by a first domain server and a second domain server, respectively, wherein said first and second browser frames are part of one frameset element served by said first domain server, said method comprising:

in communications initiated by said first browser frame and targeting said second browser frame:
generating a notification of a change of state of said first browser frame having a first browser page served by said first domain server, said notification comprising a first URL call to an address on said second domain server,
transmitting from said frameset element served by said first domain server said first URL call on behalf of said second browser frame; and
interpreting said notification on said second domain server, and
causing a change of state of said second browser frame having a second browser page served by said second domain server in accordance with said interpretation of said notification; and
in communications initiated by said second browser frame and targeting said first browser frame:
generating a notification of a change of state of said second browser frame having said second browser page served by said second domain server, said notification comprising a second URL call to an address on said first domain server;
interpreting said notification on said first domain server and providing executable code according to said notification;
loading in a third browser frame, said third browser frame being a hidden frame, a blank browser page served by said first domain server and containing said executable code, said executable code generating an event; and
in response to said event, causing a change of state of said first browser frame served by said first domain server in accordance with said executable code.

* * * * *